US011869110B2

(12) United States Patent
Shao et al.

(10) Patent No.: US 11,869,110 B2
(45) Date of Patent: Jan. 9, 2024

(54) EARLY WARNING METHOD AND SYSTEM FOR REGIONAL PUBLIC SECURITY MANAGEMENT IN SMART CITY BASED ON THE INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Yaqiang Quan, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/049,624

(22) Filed: Oct. 25, 2022

(65) Prior Publication Data

US 2023/0066101 A1 Mar. 2, 2023

(30) Foreign Application Priority Data

Sep. 29, 2022 (CN) .......................... 202211194707.1

(51) Int. Cl.
*G06Q 10/10* (2023.01)
*G06Q 10/06* (2023.01)
(Continued)

(52) U.S. Cl.
CPC ......... *G06Q 50/265* (2013.01); *B64C 39/024* (2013.01); *G06V 20/52* (2022.01); *G08B 21/02* (2013.01); *B64U 2101/30* (2023.01)

(58) Field of Classification Search
CPC .. G06Q 50/265; G06Q 50/26; G06Q 10/0635; B64C 39/024; G06V 20/52;
(Continued)

(56) References Cited

U.S. PATENT DOCUMENTS

| 8,564,661 | B2* | 10/2013 | Lipton | ............. | G08B 13/19656 |
| | | | | | 382/103 |
| 2010/0026802 | A1* | 2/2010 | Titus | ..................... | H04N 7/188 |
| | | | | | 348/143 |

(Continued)

FOREIGN PATENT DOCUMENTS

| CN | 102999956 A | 3/2013 |
| CN | 106373240 A | 2/2017 |

(Continued)

OTHER PUBLICATIONS

Santamaria, A. F., Raimondo, P., Tropea, M., De Rango, F., & Aiello, C. (2019). An IoT surveillance system based on a decentralised architecture. Sensors, 19(6), n/a. doi:http://dx.doi.org/10.3390/s19061469, 2019. (Year: 2019).*

(Continued)

*Primary Examiner* — Jonathan P Ouellette
(74) *Attorney, Agent, or Firm* — METIS IP LLC

(57) ABSTRACT

An early warning method and system for a regional public security management in a smart city based on the IoT are provided. The early warning method includes: sending, based on a sensing network sub-platform, a monitoring image of a target region to the management sub-platform; processing, based on a management sub-platform, the monitoring image to determine a risk index of the at least one target region; generating early warning information in response to the risk index of the target region greater than a first threshold, and sending the early warning information to the user platform through a general database of the management platform and the service platform; and obtaining a management instruction based on the user platform, and controlling, according to the management instruction, an unmanned aerial vehicle to go to the target region for monitoring.

6 Claims, 6 Drawing Sheets

(51) Int. Cl.
*G06Q 30/06* (2023.01)
*G06Q 30/02* (2023.01)
*G06Q 50/26* (2012.01)
*B64C 39/02* (2023.01)
*G06V 20/52* (2022.01)
*G08B 21/02* (2006.01)
*B64U 101/30* (2023.01)

(58) Field of Classification Search
CPC .... G06V 20/53; G06V 40/1365; G08B 21/02; B64U 2101/30; B64U 2101/31; Y02A 30/60; G06F 16/53; H04L 67/12
USPC .......................................... 705/1.1–912, 325
See application file for complete search history.

(56) References Cited

U.S. PATENT DOCUMENTS

2017/0092109 A1* 3/2017 Trundle ............... G08B 25/006
2017/0243472 A1 8/2017 Davies et al.
2020/0334470 A1* 10/2020 Abeykoon ............. G06V 10/96
2021/0279603 A1* 9/2021 Teran Matus .......... G06V 20/40

FOREIGN PATENT DOCUMENTS

| CN | 108257362 A | 7/2018 |
| CN | 112233300 A | 1/2021 |
| CN | 114971409 A | 8/2022 |
| CN | 115083089 A | 9/2022 |

OTHER PUBLICATIONS

First Office Action in Chinese Application No. 202211194707.1 dated Nov. 10, 2022, 23 pages.
Zhang, Yudong, Research on Risk Diagnosis and Adaptive Mechanism of Urban Areas Oriented to Fire Control and Safety, Chinese Doctoral Dissertations Full-text Database, 2019, 153 pages.
Notification to Grant Patent Right for Invention in Chinese Application No. 202211194707.1 dated Dec. 2, 2022, 2 pages.

* cited by examiner

600

```
┌─────────────────────────────────────────────┐
│ Determining a distance between suspicious   │  ╱610
│ persons based on monitoring images of a     │
│ plurality of adjacent frames                │
└─────────────────────────────────────────────┘
                      │
                      ▼
┌─────────────────────────────────────────────┐
│ Determining the suspicious group to which   │  ╱620
│ the suspicious persons belong based on the  │
│ distance                                    │
└─────────────────────────────────────────────┘
                      │
                      ▼
┌─────────────────────────────────────────────┐
│ Determining the risk index of the target    │  ╱630
│ region based on the suspicious group        │
└─────────────────────────────────────────────┘
```

FIG. 6

EARLY WARNING METHOD AND SYSTEM FOR REGIONAL PUBLIC SECURITY MANAGEMENT IN SMART CITY BASED ON THE INTERNET OF THINGS

CROSS-REFERENCE TO RELATED APPLICATION

This application claims priority of Chinese Patent Application No. 202211194707.1, filed on Sep. 29, 2022, the contents of which are entirely incorporated herein by reference.

TECHNICAL FIELD

The present disclosure involves a field of public security management, and specially involves an early warning method and system for a regional public security management in a smart city based on the Internet of Things (IoT).

BACKGROUND

A public security management is a basic guarantee for a normal operation of people's social life. An existing public security management in a city is generally performed through checking real-time monitoring information of a community, a street, a shopping mall, a parking lot, etc., or scheduling patrols. When it is preliminarily determined that there may be suspicious behaviors in the region through the monitoring information, a patrol person may be arranged to go to the scene to check, which may result in insufficient distribution of a police resource.

Therefore, it is hoped to propose an early warning method and system for regional public security management in a smart city based on the IoT, which can further clearly determine a public security work to improve the efficiency of the public security management.

SUMMARY

One of the embodiments of the present disclosure provides an early warning method for a regional public security management in a smart city based on the Internet of Things (IoT). The IoT includes a user platform, a service platform, a public security management platform, a sensing network platform and object platforms interacted in turn, the early warning method including: obtaining, based on the user platform, a user's inquiry instruction of each region, and sending the inquiry instruction to the public security management platform through the service platform; in response to the inquiry instruction, obtaining, from at least one monitoring device of at least one target region based on a sensing network sub-platform of the sensing network platform, a monitoring image of the at least one target region by the public security management platform; the at least one monitoring device being configured in the different object platforms, the sensing network platform uses different sensing network sub-platforms to store, process and/or transmit data from different object platforms, and the sensing network sub-platforms correspond to different target regions; the public security management platform uses different management sub-platforms for the data storage, the data processing and/or the data transmission, and performs a data summarizing, the data processing and the data transmission through a general database of the public security management platform; sending, based on the sensing network sub-platform, the monitoring image of the corresponding target region to the management sub-platform; processing, based on the management sub-platform, the monitoring image to determine a risk index of the at least one target region; generating early warning information in response to the risk index of the target region greater than a first threshold, and sending the early warning information to the user platform through a general database of the management platform and the service platform; and obtaining a management instruction based on the user platform, and controlling, according to the management instruction, an unmanned aerial vehicle (UAV) to go to the target region for monitoring.

One of the embodiments of the present disclosure further provides a n early warning system for a regional public security management in a smart city based on the IoT, wherein the early warning system includes a user platform, a service platform, a public security management platform, a sensing network platform and an object platform interacted in turn, wherein: the user platform is configured as at least one terminal device to obtain a user's inquiry instruction on a risk index of each region; and the object platform is configured as at least one monitoring device; the public management platform is configured to: obtain the inquiry instruction based on the user platform; in response to the inquiry instruction, obtain, from at least one monitoring device of at least one region based on a sensing network sub-platform of the sensing network platform, a monitoring image of the at least one target region by the public security management platform; the at least one monitoring device being configured in the different object platforms, wherein the sensing network platform uses different sensing network sub-platforms to store, process and/or transmit data from different object platforms, and the sensing network sub-platforms respond to different target regions; the public security management platform uses different management sub-platforms for the data storage, the data processing and/or the data transmission, and performs a data summarizing, the data processing and the data transmission through a general database of the public security management platform; send, based on the sensing network sub-platform, the monitoring image of the corresponding target region to the management sub-platform; process, based on the management sub-platform, the monitoring image to determine a risk index of the at least one target region; generate early warning information in response to the risk index of the target region greater than a first threshold, and send the early warning information to the user platform through a general database of the management platform and the service platform; and obtain a management instruction based on the user platform, and control, according to the management instruction, an unmanned aerial vehicle (UAV) to go to the target region for monitoring.

One of the embodiments of the present disclosure further provides an early warning device for a regional public security management in a smart city based on the IoT, including a processor, the processor is used to perform the aforesaid early warning method for a regional public security management in a smart city based on the IoT.

One of the embodiments of the present disclosure further provides a computer-readable storage medium storing computer instructions, wherein when reading the computer instructions in the storage medium, a computer implements the aforesaid early warning method for a regional public security management in a smart city based on the IoT.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein:

FIG. 6 is a flowchart illustrating an exemplary process for determining a risk index based on a suspicious group according to some embodiments of the present disclosure.

DETAILED DESCRIPTION

Figure 1:
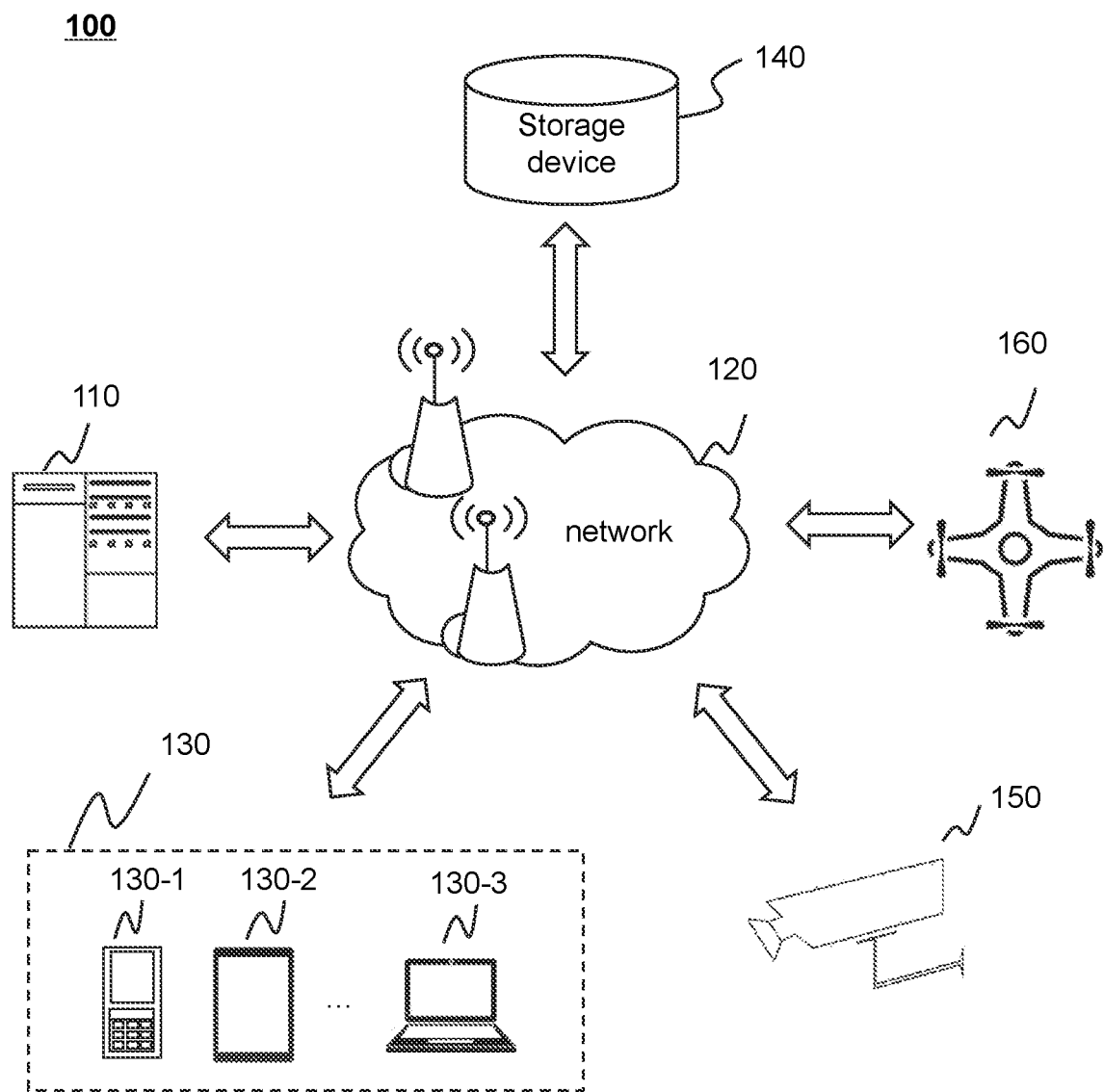
FIG. 1 is a schematic diagram illustrating an application scenario of an early warning system for a regional public security management according to some embodiments of the present disclosure.

In order to illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the scope of the present disclosure. Unless obvious according to the context or illustrated specifically, the same numeral in the drawings refers to the same structure or operation.

It should be understood that the terms "system", "device", "unit" and/or "module" used in the specification are means used to distinguish different assemblies, elements, parts, segments, or assemblies. However, these words may be replaced by other expressions if they serve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or assemblies, but do not preclude the presence or addition of one or more other features, integers, steps, operations, elements, assemblies, and/or groups thereof.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added into the flowcharts. One or more operations may be removed from the flowcharts.

FIG. 1 is a schematic diagram illustrating an application scenario of an early warning system for regional public security management according to some embodiments of the present disclosure.

In some embodiments, the early warning system 100 for the regional public security management (also referred to as the early warning system 100) may include a processing device 110, a network 120, a terminal 130, a storage device 140, a monitoring device 150, and an unmanned aerial vehicle (UAV) 160. In some embodiments, the early warning system 100 may be applied in a public security management in a public region. The early warning system 100 may achieve the early warning for the regional public security management in a smart city based on the IoT through a method and/or a process of the embodiments of the present disclosure. In some embodiments, assemblies in the early warning system 100 may connect and/or communicate with each other through the network 120 (such as wireless connection, wired connection or the combination thereof). For example, the processing device 110 may be connected with the storage device 140 through the network 120.

The processing device 110 may process the data and/or information obtained from other device or system assembly. In some embodiments, the processing device 110 may access information and/or data from the terminal 130, the storage device 140, the monitoring device 150 and/or the UAV 160. For example, the processing device 110 may obtain a monitoring image of a target region from the monitoring device 150. In some embodiments, the processing device 110 may process information and/or data from the terminal 130, the storage device 140, the monitoring device 150 and/or the UAV 160. For example, the processing device 110 may determine a risk index of the target region based on the monitoring image, and when the risk index is greater than a first threshold, the processing device 110 may generate an early warning message and control the UAV 160 to monitor the target region. In some embodiments, the processing device 110 may be a server or a server group. In some embodiments, one or more different servers may be configured as a management platform 230 and a service platform 220. For example, the processing device 110 may include a first server and a second server, the first server may be configured as the service platform 220, and the second server may be configured as the public security management platform 230.

The network 120 may include any suitable network that can facilitate information and/or data exchange among each assembly of the early warning system 100. One or more assemblies of the early warning system 100 (for example, the processing device 110, the terminal 130, the storage device 140, the monitoring device 150 and/or the UAV 160) may exchange information and/or data via the network 120. For example, the network 120 may send a monitoring image of the target region obtained from the monitoring device 150 to the processing device 110. In some embodiments, the network 120 may be any one or both types of a wiring network and a wireless network. In some embodiments, the network may be of a point-to-point structure, a shared structure, and a central structure, or any combination thereof. In some embodiments, network 120 may include one or more network access points. For example, the network 120 may include wiring or wireless network access points.

The terminal 130 may communicate and/or connect with the processing device 110, the storage device 140, the monitoring device 150, the UAV 160. For example, the terminal 130 may send one or more control instructions to the monitoring device 150 through the network 120 to control the monitoring device 150 to shoot the target region according to the instructions, and/or send one or more control instructions to the UAV 160 to control the UAV 160 to perform a detection on the target region according to the instructions. For another example, a user may record a suspicious person in the image taken by a plurality of monitoring devices 150 through the terminal 130. The terminal 130 may transmit the image to the storage device 140 for storage, or it may send the image to the processing device 110 for a continuous processing. In some embodiments, the user may be a policeman or a street managing person. In some embodiments, the terminal 130 may be any one or combination of devices with an input/output function, including a mobile device 130-1, a tablet computer 130-2, a laptop computer 130-3, etc. The above examples are only used to illustrate the breadth of the scope of the terminal device 130 and is not intended to limit its scope.

The storage device 140 may be configured to store data, an instruction and/or any other information. In some embodiments, the storage device 140 may store data obtained from the processing device 110, the terminal 130, the monitoring device 150 and/or the UAV 160. For example, the storage device 140 may be used to store a monitoring image of a target object obtained by the monitoring device 150. In some embodiments, the storage device 140 may store the data and/or instruction used by the processing device 110 to perform or achieve the exemplary method described in the present disclosure.

In some embodiments, the storage device 140 may include a mass memory, a removable storage, a volatile read and write memory, an only read memory (ROM), or any combination thereof. In some embodiments, the storage device 140 may be implemented on a cloud platform.

The monitoring device 150 may be configured to collect data and/or information. For example, the monitoring device 150 may be used to collect an image, a video, a sound, etc. In some embodiments, the monitoring device 150 may include a data camera, a camera, and other devices. In some embodiments, the monitoring device 150 may send the collected data and/or information to the processing device 110 through the network 120, or the data and/or information may further be sent to the storage device 140 through the network 120.

The UAV 160 may be configured to further monitor the target region. In some embodiments, the UAV 160 may include an unmanned fixed-wing aircraft, an unmanned vertical take-off and landing aircraft, an unmanned airship, an unmanned helicopter, an unmanned multi-rotor aircraft, an unmanned parachute, etc. In some embodiments, when the risk index of the target region in the monitoring image taken by the monitoring device 150 is greater than the first threshold, the processing device 110 and/or the terminal 130 may further control the UAV 160 to further monitor the target region. An UAV monitoring may further determine a public security situation in the target region, avoid waste of a public security management resource due to a misjudgment, thereby improving an efficiency of the public security management.

It should be noted that the application scenario is only provided for the purpose of explanation, and does not intend to limit the scope of the present disclosure. For those skilled in the art, a variety of modifications or changes may be made according to the description of the present disclosure. For example, the application scenario may further include a database. For another example, the application scenario may achieve similar or different functions on other devices. However, the changes and modifications may not deviate from the scope of the present disclosure.

Figure 2:
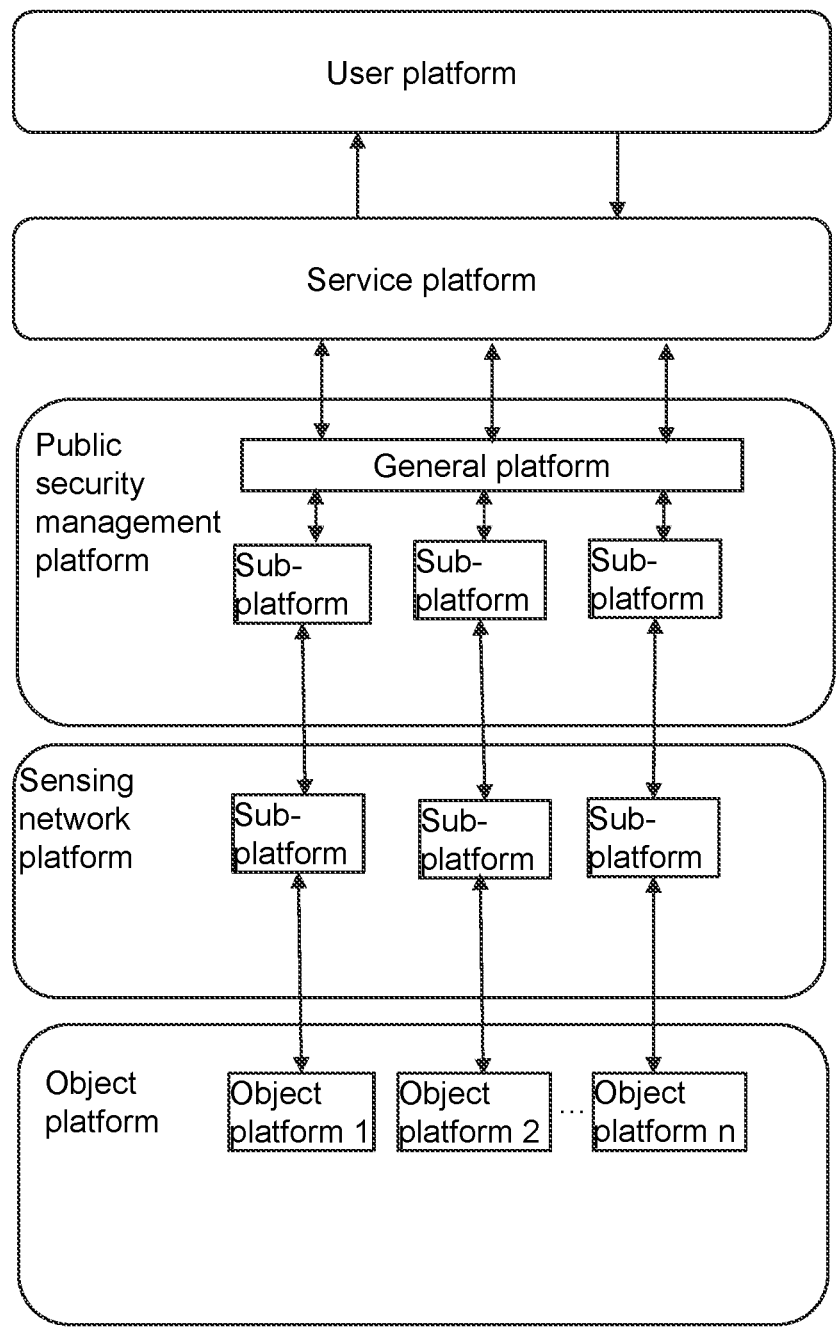
FIG. 2 is a module diagram illustrating an exemplary early warning system for the regional public security management according to some embodiments of the present disclosure.

FIG. 2 is a module diagram illustrating an exemplary early warning system for the regional public security management according to some embodiments of the present disclosure. As shown in FIG. 2, an early warning system 200 for the regional public security management may include a user platform 210, a service platform 220, a public security management platform 230, a sensing network platform 240, and an object platform 250. In some embodiments, the early warning system 200 for the regional public security management may be a part of the processing device 110 or may be implemented by the processing device 110.

In some embodiments, the early warning system 200 for the regional public security management may be implemented based on the IoT system. In some embodiments, the processing of information in the IoT system may be divided into a processing process of perceptual information and a processing process of controlling information. The controlling information may be information generated based on the perceptual information. The processing of the perceptual information may be that the user platform 210 obtains the perceptual information and transmit the perceptual information to the public security management platform 230. The control information may be issued by the public security management platform 230 to the user platform 210, thereby achieving corresponding control. In some embodiments, when applying the IoT system to an urban management, it may be called a smart city IoT system.

The user platform 210 may be a platform for interacting with a user. In some embodiments, the user platform 210 may be configured as a terminal device (for example, the terminal 140), for example, the terminal device may include a mobile device, a tablet computer, etc. or any combination thereof. In some embodiments, the user platform 210 may be used to receive a request and/or an instruction input by the user. For example, the user platform 210 may obtain a user's query request for a risk index of a target region through the terminal device.

The service platform 220 may be a platform for receiving and transmitting data and/or information. For example, the service platform 220 may send the query request generated by the user platform 210 to the public security management platform 230. For another example, the service platform 220 may send early warning information generated by the security management platform 230 to the user platform 210.

The public security management platform 230 may refer to a platform for planning and coordinating a connection and a cooperation between various functional platforms, gathering all information of the IoT, and providing a perception management and a control management functions for the operation system of the IoT. For example, the public security management platform 230 may obtain a public security situation of the target region through the sensing network platform 240 and the object platform 250 (for example, an appearance of a suspicious person, etc.), and an instruction for further monitoring on the target region may be sent to an UAV through the public security management platform 230 based on the public security situation. In some embodiments, the public security management platform 230 may include the processing device 110 and other assemblies in FIG. 1. In some embodiments, the public security management platform 230 may be a remote platform controlled by a manager, an artificial intelligence, or a preset rule.

In some embodiments, the public security management platform 230 may adopt a front split arrangement. The front split arrangement may refer to that the public security management platform is provided with a general database and a plurality of management sub-platforms. The plurality of management sub-platforms may perform a storage, a processing and/or a transmission on corresponding data according to different data sources, and each management sub-platform may further summarize the processed data to the general database. The public security management platform may analyze, process, and store the summarized data, and then transmit the data to the service platform through the general database. In some embodiments, the plurality of management sub-platforms included in the public security management platform 230 may be determined according to a preset region in a city. For example, the public security management platform 230 may include a number of management sub-platforms such as a management sub-platform corresponding to an A region, a management sub-platform corresponding to a B region, and a management sub-platform corresponding to a C region.

In some embodiments, in response to a user's demand for a query of the risk index in various regions of the city, the public security management platform 230 may obtain information like a monitoring image, etc. of the corresponding region from a corresponding sensing network sub-platform of the sensing network platform through the public security sub-platform of the public security management platform 230. The information may be stored, analyzed, and processed, thereby determining the risk indexes of the corresponding regions. For example, through the management sub-platform corresponding to the A region, the management sub-platform corresponding to the B region, and the management sub-platform corresponding to the C region of the public security management platform 230, the risk indexes of regions A, B, and C may be respectively determined and summarized to the general database of the management platform. The public security management platform 230 may upload the risk index of each region to the service platform 220 through the general database, and then upload the risk index of each region to the user platform 210 to feedback to the user through the service platform 220. The user may plan and coordinate a follow-up arrangement based on different risk situations in each region.

The sensing network platform 240 may be a functional platform for managing a sensing communication. In some embodiments, the sensing network platform 240 may connect the public security management platform 230 and the object platform 250 to realize the functions of a perceptual information sensing communication and a control information sensing communication. In some embodiments, the sensing network platform may include a plurality of sensing network sub-platforms.

In some embodiments, the sensing network platform may adopt an independent arrangement. The independent arrangement may refer to that the sensing network platform 240 may adopt different sub-platforms for a data storage, a data processing and/or a data transmission for data of different types or data sources. In some embodiments, the plurality of sensing network sub-platforms included in the sensing network platform 240 may be determined according to the preset region in a city, which may be corresponding to the management sub-platforms of the security management platform. For example, the sensing network platform may include the sensing network sub-platforms corresponding to the A region, the B region, and the C region, which correspond to the management sub-platforms corresponding to the A region, the B region, and the C region, respectively.

In some embodiments, in response to the inquiry instruction issued by the management sub-platform of the public security management platform 230, the sensing network platform 240 may obtain information like the monitoring image, etc. from the corresponding monitoring device in the object platform 250 through the corresponding sensing network sub-platform, and upload the information to the corresponding management sub-platform of the management platform 230.

The object platform 250 may be a functional platform generating the perceptual information. In some embodiments, the object platform 250 may be configured to include at least one monitoring device. In some embodiments, the object platform 250 may be configured to obtain information related to public security in the target region. For example, the object platform 250 may obtain the monitoring images of different target regions, etc. based on the monitoring device 150. In some embodiments, the at least one monitoring device provided for the object platform 250 may have a unique identification (such as number, etc.) according to the preset rule, and the identification may have a corresponding relationship with the preset region, so that the sensing network sub-platform of the sensing network platform 240 may obtain information like the monitoring images, etc. of the corresponding region from the corresponding monitoring device. For example, the sensing network sub-platform corresponding to the A region may obtain the monitoring images of the A region from the monitoring device arranged in the A region.

It should be noted that the above description of the system and its components is only for the convenience of description, and it cannot limit the scope of the present disclosure to the scope of the embodiment. It should be understood that for those skilled in the art, after understanding the principle of the system, each of the components may be arbitrarily combined, or may compose a sub-system to connect with other parts without departing from the principle. For example, an urban vaccine management platform and a vaccine service platform may be integrated into one assembly. For another example, each assembly may share a storage device, and each assembly may further have their own storage device. Such deformations are within the protection range of the present disclosure.

Figure 3:
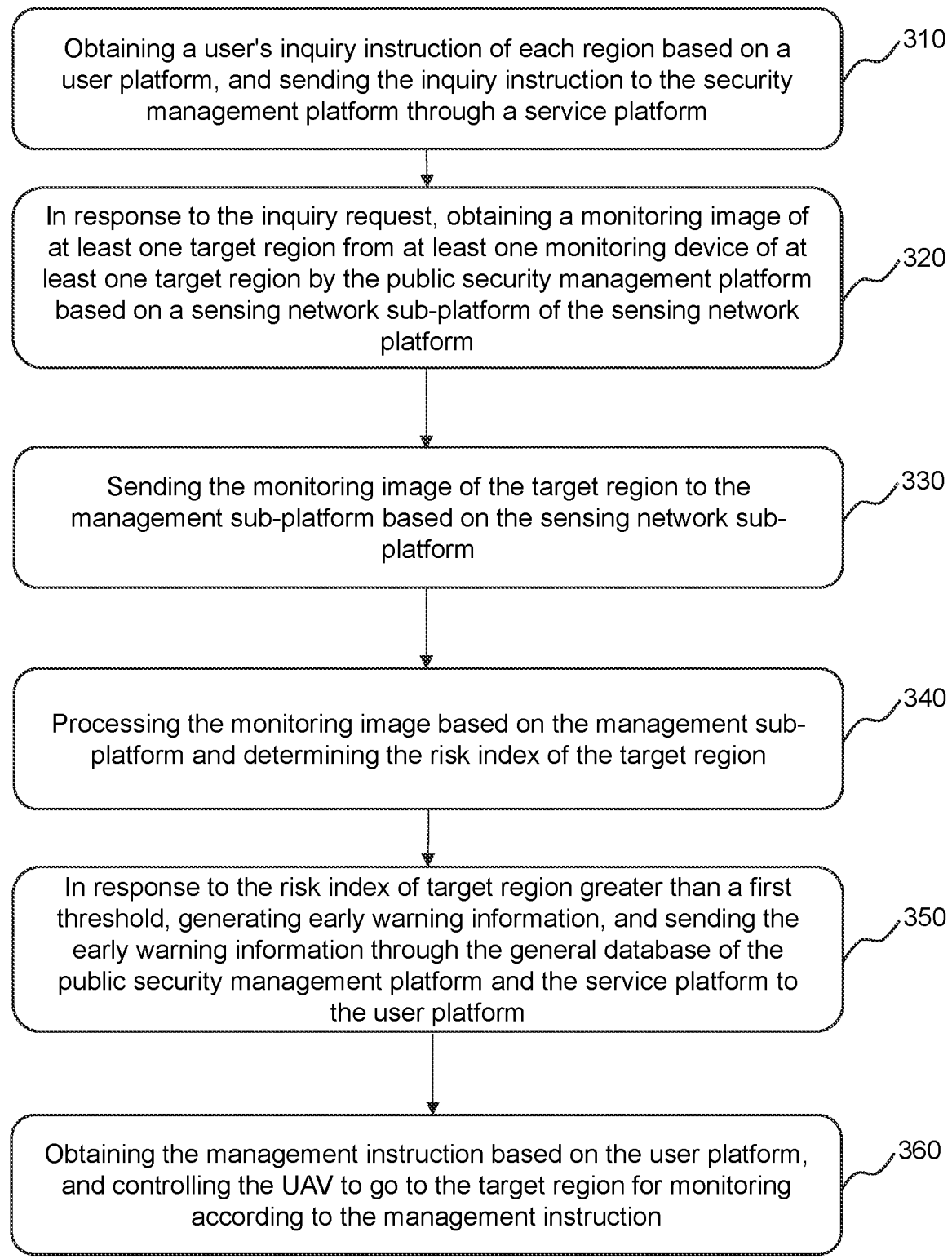
FIG. 3 is a flowchart illustrating the exemplary early warning method for a regional public security management in a smart city based on the IoT according to some embodiments of the present disclosure.

FIG. 3 is a flowchart illustrating the exemplary early warning method for regional public security management in a smart city based on the IoT according to some embodiments of the present disclosure. In some embodiments, the early warning method for the regional public security management in a smart city based on the IoT may be performed by the early warning system 100 for the regional public security management (for example, the processing device 110) or the early warning system 200 for the regional public security management (e.g., the public security management platform 230). For example, the process 300 may be stored in a storage device (e.g., the storage device 140) in the form of a program or an instruction. When the processing device 110 or the security management platform 230 performs the program or instruction, the process 300 may be achieved. An operation diagram of the process 300 presented as follows is for the purpose of explanation. In some embodiments, one or more additional operations that are not described above and/or one or more operations that are not discussed may be used to complete the process. In addition, the order of the operation of the process 300 described in FIG. 3 is not restrictive.

In 310, obtaining a user's inquiry instruction of each region based on a user platform, and sending the inquiry instruction to the security management platform through a service platform.

The inquiry instruction may refer to an instruction request for inquiring a risk index of a region. In some embodiments, the user may obtain the user's inquiry instruction on risk indexes of various regions through the user platform.

In 320, in response to the inquiry request, obtaining a monitoring image of at least one target region from at least one monitoring device of at least one target region by the public security management platform based on a sensing network sub-platform of the sensing network platform.

The target region may refer to one or more public regions that need to be monitored. For example, an indoor or outdoor region such as a park, a shopping mall, a community, a bank, etc. In some embodiments, the target region may include at least one monitoring device deployed in advance.

The monitoring device may refer to a device that monitors people or a behavior in the target region. The monitoring device may be a variety of data collection devices, such as a camera, a video recorder, an image sensor, etc.

In some embodiments, the at least one monitoring device may be arranged in the object platform 250. For example, the monitoring device may be one or more cameras in the object platform 250.

The monitoring image may refer to image or video data in the target region collected by the monitoring device. For example, the monitoring image may be a frame, a video or one or more frames in a video.

In some embodiments, the monitoring device may upload the monitoring image to the public security management platform 230 through the sensing network platform 240 to analyze, store and process the monitoring image.

In some embodiments, both the public security management platform 230 or the sensing network platform 240 may be provided with a plurality of sub-platforms. The plurality of sub-platforms may be determined according to a plurality of regions preset in the city. The monitoring image obtained by the monitoring device in the target region may be uploaded to the corresponding management sub-platform of the public security management platform 230 through the corresponding sub-platform of the sensing network platform 240. For more content about this, see FIG. 2 and its description.

In 330, sending the monitoring image of the target region to the management sub-platform based on the sensing network sub-platform.

In some embodiments, the sensing network sub-platform may obtain information like monitoring images from the monitoring devices configured in different object platforms, and upload the monitoring images to the management sub-platform of the management platform 230. For example, the sensing network sub-platform corresponding to the A region may obtain the monitoring image in the A region from the monitoring device arranged in the A region.

In 340, processing the monitoring image based on the management sub-platform and determining the risk index of the target region.

The risk index may refer to a possibility of an occurrence of various public security incidents in the target region. For example, the risk index may refer to the possibility of the occurrence of the public security incidents such as fighting, robbery, and theft in the target region. The risk index may be expressed as values within a preset value range, such as the value within the interval of [0, 10], or expressed as a preset level, such as levels 1, 2, 3, or low, intermediate, serious, and other different expressions.

In some embodiments, the risk index may be determined based on a preset rule. For example, the possibility of the occurrence of theft in the region with a larger population may be greater than that in the region with a smaller population, and correspondingly, the former region may have a higher risk level. For another example, when there is no one in the target region, the risk index may be set to 0. In some embodiments, the risk index may further be determined based on the public security incidents occurred in the region in the past. For example, a plurality of public security incidents in a certain type occurred in the target region in the past three years, then the risk index of the target region may be regarded as at a high level.

In some embodiments, the public security management platform 230 may determine a suspicious index of at least one person in the monitoring image, and in response to the suspicious index meeting a preset condition, determine the person as the suspicious person. Further, the public security management platform 230 may determine the risk index of the target region based on the suspicious person. For more descriptions of determining the risk index of the target region based on the suspicious person, see FIG. 4 and its description.

In some embodiments, the public security management platform 230 may analyze and process the monitoring images of a plurality of adjacent frames to determine a distance between suspicious persons. Further, the public security management platform 230 may determine a suspicious group corresponding to the suspicious persons based on the distance, and determine the risk index of the target region based on the suspicious group. For more explanations on determining the risk index of the target region based on the suspicious group, see FIG. 6 and its description.

In 350, in response to the risk index of target region greater than a first threshold, generating early warning information, and sending the early warning information through the general database of the public security management platform and the service platform to the user platform.

The first threshold may refer to a preset threshold of the risk index used to determine whether to perform early warning. For example, for a value of risk index within the range of [0, 10], the first threshold may be set to 5. The first threshold may be determined based on a social experience. For example, the first threshold may be determined according to a situation of the historical public security incident of the target region. Different target regions may correspond to different first thresholds. For example, in a prosperous region with more developed economy, social security risk incidents are more likely to occur, so the first threshold may be set lower to prevent the occurrence of incident in advance.

The early warning information may refer to information used to remind that there may be a risk in the target region. The early warning information may be any one or a combination of text information, sound information, image information, etc. For example, the early warning information may be the text information displayed in the terminal device, such as "Please note that there are a plurality of highly suspicious persons in the mall!"; the early warning information may further be sound information or audio information played by an alarm device or a broadcast device.

In some embodiments, each management sub-platform may generate early warning information of the risk index of corresponding each target region. The general database of the public security management platform 230 may summarize and analyze the data processed by each management sub-platform. In some embodiments, the summarized data may be sent to the user platform through the service platform, and the user may issue a management instruction to perform relevant management (such as whether to send an UAV for further monitoring, etc.) according to the summarized data in the user platform. The management instruction may refer to an instruction issued by the user to further monitor the target region.

In some embodiments, the public security management platform 230 may further determine a management plan according to summarized and analyzed data, and send the management plan to the user platform through the service platform for the user to confirm. For example, the management plan may include whether there is a need for dispatching the UAV for further monitoring in each target region, a number of UAVs to be dispatched, and the frequency of UAVs to be dispatched, etc. Correspondingly, the user may review the management plan in the user platform and issue the corresponding management instruction based on the reviewed management plan. In some embodiments, the public security management platform 230 may send the early warning information to the user platform 210 through the service platform 220 to feedback to the user. For example, the public security management platform 230 may feedback the text information of the early warning to the terminal device of the user platform and show the information to the user.

In 360, obtaining the management instruction based on the user platform, and controlling the UAV to go to the target region for monitoring according to the management instruction.

In some embodiments, when the risk index of the target region is greater than the first threshold, the public security management platform 230 may further control the UAV to the target region to monitor the target region. The UAV may be installed with the monitoring device (such as a camera, etc.), which may further monitor the target region. For more content of the UAV, see FIG. 1 and the related description.

In some embodiments, the UAV may be controlled by the terminal device (e.g., the terminal 130). In response to the early warning information received by the user through the user platform, the user may issue a control instruction to control the UAV. For example, the user may input the control instruction through the terminal device of the user platform. The control instruction may include the target region, the navigation route, etc. The UAV may go to the target region and monitors the target region by performing the control instruction. The UAV may track and monitor the suspicious person in the target region under a human control. The UAV may be instead of the police for monitoring when the police are not on duty.

In some embodiments of the present disclosure, the risk index of the target region may be determined in real time based on the monitoring image to improve the timeliness of the early warning. After the risk index exceeds a certain threshold, an early warning may be generated and the UAV may be controlled to go to the corresponding target region for further monitoring, so as to perform public security management, thereby improving a management efficiency.

In some embodiments, the public security management platform 230 may further obtain a plurality of risk indexes of the target region in a plurality of time periods.

The plurality of time periods may refer to a plurality of historical time periods as of the current time. For example, the plurality of time periods may be each day in the past week. For another example, the plurality of time periods may be in the mornings (6:00-11:00), afternoons (14:00-18:00), and evenings (18:00-24:00) of the last three days, etc.

In some embodiments, the public security management platform 230 may further determine the target region as a daily patrol point in response to the average value of a plurality of risk indexes greater than a second threshold.

The second threshold may refer to a threshold of the risk index used to determine the daily patrol point. For example, the second threshold may be 6 or 4, etc. The second threshold may be set based on a preset rule.

The daily patrol point may refer to the target region where a security person is arranged to patrol according to a certain patrol frequency.

In some embodiments, the public security management platform 230 may determine the daily patrol point based on a situation of the occurrence of the historical public security incidents of at least one target region. For example, the public security management platform 230 may count a number or frequency of the public security incidents in the plurality of target regions in a past period (such as over the past month, etc.). The target region with a larger number and higher frequency of the public security incidents may be set as a daily patrol point.

In some embodiments, the public security management platform 230 may further determine the plurality of risk indexes of the target region in the plurality of time periods based on the monitoring image of at least one target region, and then calculate the average value of the plurality of risk indexes. When the average value is greater than the second threshold, the public security management platform 230 may determine the target region as the daily patrol point.

In some embodiments, the public security management platform 230 may further determine a petrol frequency of the daily patrol point.

The petrol frequency may refer to a number of patrols within a preset period. For example, the patrol frequency can be 5 times a day, and once every 2 hours. For another example, the patrol frequency may be 3 times between 06:00-11:00, and 5 times between 20:00-00:00.

In some embodiments, the patrol frequency may be related to a proportion of suspicious group with a high suspicious index in a suspicious group distribution vector. The suspicious group with a high suspicious index may be a suspicious group with a suspicious index greater than a preset threshold. For example, the greater the proportion of suspicious group with a high suspicious index in a suspicious group distribution vector, correspondingly, the higher the patrol frequency may be. For more explanations about the suspicious group with a high suspicious index, see FIG. 6 and its related description.

In some embodiments of the present disclosure, through processing the plurality of risk indexes in the target region, the risk index of the target region may be determined more comprehensively from different perspectives. When the average value of the risk indexes is greater than the second threshold, the target region may be determined as the daily patrol point, and the monitoring on the target region may be strengthened, so as to help improve a security of the region. In addition, relating the petrol frequency and the proportion of suspicious group with a high suspicious index in a suspicious group distribution vector may help to determining the petrol in the target region more efficiently, thereby improving a petrol efficiency, which is beneficial for reasonably using a petrol resource.

Figure 4:
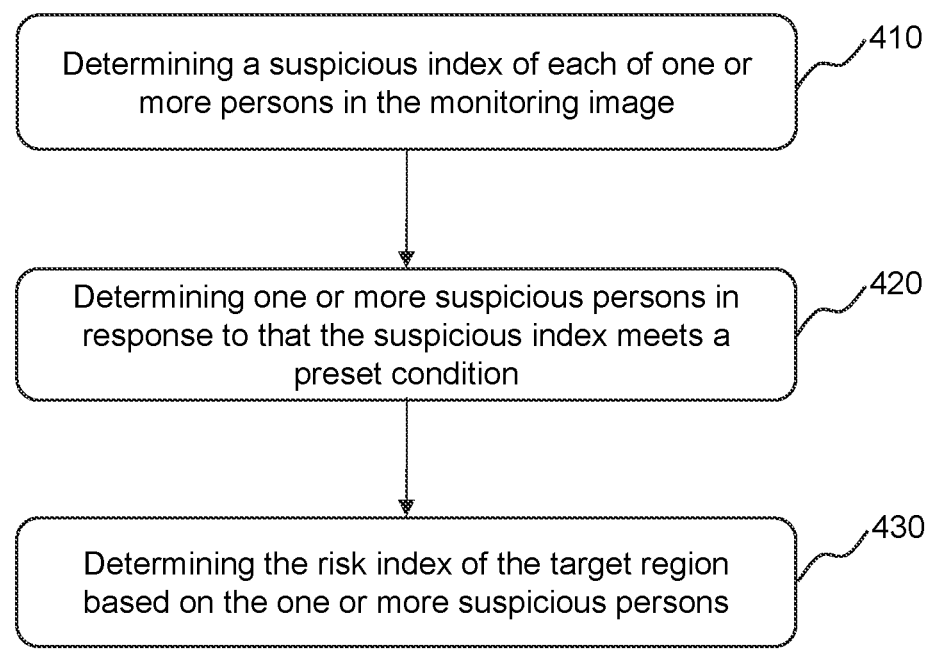
FIG. 4 is a flowchart illustrating an exemplary process for determining a risk index based on a suspicious person according to some embodiments of the present disclosure.

FIG. 4 is a flowchart illustrating an exemplary process for determining a risk index based on a suspicious person according to some embodiments of the present disclosure. In some embodiments, the process for determining the risk index based on the suspicious person may be performed by the early warning system 100 for the regional public security management (for example, the processing device 110) or the early warning system 200 for the regional public security management (e.g., the public security management platform 230). For example, the process 400 may be stored in the storage device (e.g., the storage device 140) in the form of a program or an instruction. When the processing device 110 or the security management platform 230 performs the program or the instruction, the process 400 may be achieved. An operation diagram of the process 400 presented as follows is for the purpose of explanation. In some embodiments, one or more additional operations that are not described above and/or one or more operations that are not discussed may be used to complete the process. In addition, the order of the operation of the process 400 described in FIG. 4 is not restrictive.

In 410, determining a suspicious index of each of one or more persons in the monitoring image.

The suspicious index may refer to a possibility of a person causing a public security incident. The suspicious index may be a value in the interval of [0, 10], such as 0, 5, 8, etc.

In some embodiments, the public security management platform 230 may determine a frequency or times for at least one person to appear in the target region, and determine the suspicious index of the person based on the above frequency and historical statistic data of a public security incident occurred in the target region in the time period. For example, the person has appeared every day in the target region in the past six months, but no public security incident has occurred, then the suspicious index of the person is low. For another example, person A has appeared in the target region, and there is no face information of the person in the historical statistics, then the suspicious index of person A may be set higher, indicating that person A needs to be focused on first. It should be noted that it is not limited here that the more times a person appears in the target region, the lower his suspicious index, nor is it limited that the smaller number of times the person appears in the target region, the higher his suspicious index is.

In some embodiments, the suspicious index may be related to a region type of the region where the monitoring device is located.

The region type may refer to an attribute or property of the target region. For example, the region type can include a bank, a jewelry shop, a supermarket, a hotel, etc. For another example, the region type may include a square, a community, a park, a commercial street, etc.

The type, quantity, and frequency of a public security incident in different types of regions may be different. In some embodiments, the regions to which the monitoring devices belong may be different, and the corresponding suspicious indexes of at least one person in the monitoring image may be different. For example, the monitoring device in a barber shop region may capture person A, and there is no face information of the person A in the historical statistics data, then the suspicious index of the person A may be determined as 5; the monitoring device in a bank region may capture person B, and there is no face information of the person B in the historical statistics data, then the suspicious index of the person B may be determined as 8.

In some embodiments, the suspicious index of the suspicious person may grow with the growth of staying time of the person in the target region.

The staying time may refer to the length of time between a person who starts to appear in the target region and leave the target region. For example, the staying time may be 5 minutes or 60 minutes. The staying time may further be a cumulative staying time. For example, after leaving the target region, the person returns to the target region within less than a preset time threshold (such as 10 minutes, 5 minutes, etc.), then the person's staying time may be the sum of two staying times.

In some embodiments, the public security management platform 230 may determine the staying time of the person according to an image sequence of a plurality of frames of monitoring images. For example, the public security management platform 230 may determine the plurality of frames of monitoring images of a person, and determine the staying time of the person in the target region based on a time difference between the first and last images from the consecutive frames of images.

The suspicious index of the suspicious person may have a certain relationship with the person's staying time in the target region. The relationship may be set based on a preset rule. In some embodiments, a relationship curve of the suspicious index and the staying time may be set up according to a public security management experience. The public security management platform 230 may determine the suspicious index of the person through the preset relationship curve. For example, the suspicious index increases with the staying time; when the staying time increases to a certain degree and reaches a peak, and remains unchanged; after that, the suspicious index may decrease with the growth of the staying time. It may be understood that with the change of the staying time, the suspicious index of the person has a growth stage, a rapid growth stage, and a decline stage, etc., which may eventually tend to be a lower level. It may be understood that the monitoring of the suspicious person may attract the attention of a public security management officer in an early stage. When the suspicious person's stay time reaches a certain degree, the person may be observed by the security management officer. During the observation, a risk suspicion of the person causing the public security incident may be gradually dispelled combining with a petrol condition, that is, the person's suspicious index may be reduced. In some embodiments, the relationship between the suspicious index and the staying time may further be determined in other ways, and the present disclosure does not limit this.

In some embodiments of the present disclosure, through considering a correlation between the different region types of the target region and the risk index of the target region, an evaluation on the risk index of the target region performed by the public security management platform may be more targeting. In addition, obtaining the staying time of the suspicious person may be helpful for making the evaluation on the suspicious index of the person performed by the public security management platform more accurate.

In some embodiments, as the increase of the staying time of a person staying in the region, the suspicious index may grow at a certain growth rate. The growth rate may be related to the region type of the region where the suspicious person stays. For example, when the suspicious person stays near the barber shop, the growth rate of the suspicious index may be 1/minute. When the suspicious person stays near the bank, the growth rate of the suspicious index may be 2/minute.

In some embodiments, the growth rate of the suspicious index may further be related to a track suspicion. For example, during a preset period, the person repeatedly appears in the target region, that is, the track suspicion of the person is high. Correspondingly, the higher the track suspicion, the greater the growth rate of the suspicious index of the person.

The track suspicion may refer to a degree of suspicion of the person's action track. The track suspicion may be a value in the [0, 1] interval, such as 0.5. The track suspicion of the person includes information like the person appears in different regions, and the staying time and number of times of staying different regions, etc.

In some embodiments, the public security management platform 230 may obtain the action track of each person in the monitoring image and extract a track feature based on the action track. Further, the public security management platform 230 may determine a track suspicion based on the track feature. For more explanations of determining the suspicion of the track, see FIG. 5 and its related description.

In 420, determining one or more suspicious persons in response to the determination that the suspicious index meets a preset condition.

The preset condition may be a condition set in advance to determine whether a person is a suspicious person. For example, in case that the suspicious index is a value in the interval of [0, 10], the preset condition may be 7.

In some embodiments, the public security management platform 230 may compare and analyze the suspicious index of at least one person and the preset condition. Further, in response to the determination that the suspicious index meets the preset condition, the public security management platform 230 may determine the person as a suspicious person. Meeting the preset condition may refer to that the suspicious index is greater than or equal to the preset condition.

In 430, determining the risk index of the target region based on the one or more suspicious persons.

In some embodiments, the public security management platform 230 may determine the risk index of the target region based on the number of the suspicious persons in the target region. For example, the higher the number of suspicious persons, the higher the risk index of the target area. As an example, the risk index of the target region may be a sum of the suspicious indexes of all suspicious persons.

In some embodiments of the present disclosure, synthesizing the risk index of each of the plurality of persons in the monitoring image to determine the risk index of the target region helps to accurately evaluate the risk index of the target region.

Figure 5:
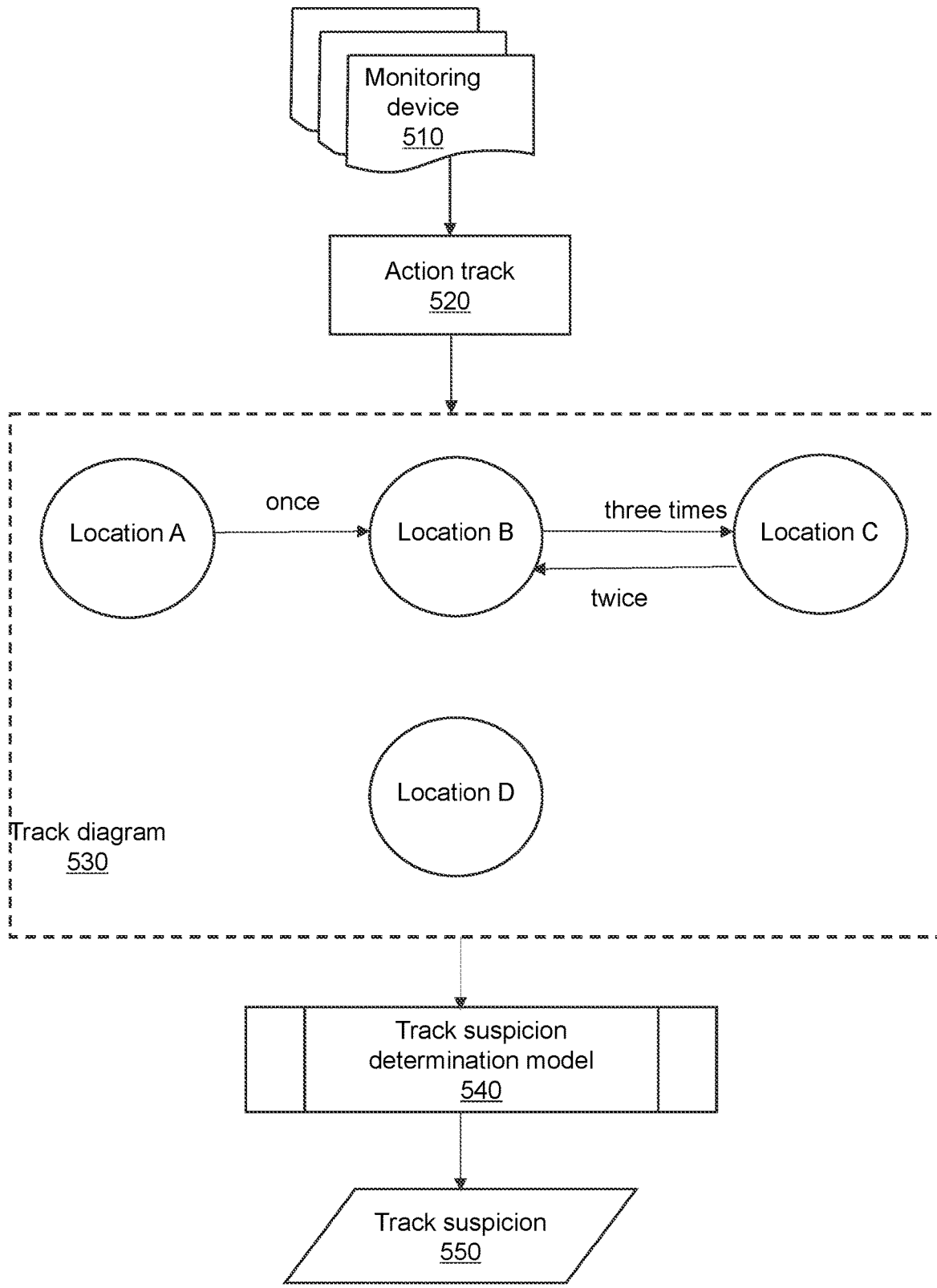
FIG. 5 is a schematic diagram illustrating an exemplary process for determining a track suspicion according to some embodiments of the present disclosure.

FIG. 5 is a schematic diagram illustrating an exemplary process for determining a track suspicion according to some embodiments of the present disclosure.

In some embodiments, as shown in FIG. 5, the public security management platform 230 may obtain an action track 520 of each person in a monitoring image 510.

The action track may refer to a path of a person staying and moving between a plurality of locations during a certain period of time. For example, the action track of the person may be "Location A→Location B→Location C→Location D→location C→location B", indicating that the person passes through the location A, location B, location C, and location D, then returns from the location D to the location C, and then from the location C to the location B. The above locations may be located in the same target region, or in different target regions.

In some embodiments, the action track may be obtained based on monitoring devices at a plurality of locations in the target region. The public security management platform 230 may perform a face recognition or a face matching etc. on the monitoring images obtained at the plurality of point locations to recognize the person in each frame of the monitoring images to determine whether the person appears in different point locations. The action track of the person may be determined according to an order of the person appearing in different point locations, the time when the person appears, and the time when the person leaves.

In some embodiments, as shown in FIG. 5, the public security management platform 230 may extract a track feature based on the action track 520.

The track feature may refer to a feature of a person's action track. The track feature may include target regions where the person has gone, a number of times of the person going to each target region, and a staying time for each target region. It should be noted that the track feature may further include a timing feature, for example, a time sequence of the persons going to the various target regions.

In some embodiments, the public security management platform 230 may determine the track feature through modeling or various data analysis algorithms. As an example, the public security management platform 230 may determine the track features like the number of times appearing at each point location, and the staying time, etc. of the person through statistics. For example, a person M appeared at the location A at 16:00, left the location A at 16:08, and then appeared at the location B at 16:10 and left at 16:30, and finally returned to the location A at 16:35 and left at 17:00. It may be seen that the number of times of M appearing in the location A is two, and the staying times are 8 minutes and 25 minutes, respectively; and the number of times of M appearing in the location B is one, and the staying time is 20 minutes.

In some embodiments, the track feature may be reflected by a track diagram. The track diagram may be a data structure composed of nodes and edges, where the edges connect the nodes, the nodes and the edges may have attributes.

In some embodiments, the public security management platform 230 may construct the track diagram based on the action track of the person.

Each node of the track diagram may be corresponding to each of the various locations in the action track of the person. For example, the node may indicate a park, a bank, a square, and other places. A node attribute of the track diagram may include the staying time of the person at the place. In some embodiments, the node attribute of the track diagram may further include the time when person appears and leaves the corresponding location. For example, the node attribute of node A may be (16:02, 16:18, 16), indicating that the person appears at the node A at 16:02, at leaves at 16:18, and the stay time is 16 minutes. If the number of the person appearing at a certain place is more than one, there may be a plurality of corresponding times of appearance, times of leaving, and staying times.

An edge of the track diagram may refer to a relationship between two target regions connected by the edge. The edge of the track diagram may be a one-way edge, and a direction of the edge indicates that the person goes from one place to the other. An edge attribute may include the number of times of the person goes from one place to the other within a period of time.

As shown in FIG. 5, the node in the track diagram 530 may include location A, location B, location C, and location D. An edge AB may be generated by pointing from location A to location B, and the edge attribute of the edge AB is 1, indicating that the person has gone from location A to location B for once in a period of time. An edge BC may be generated by pointing from location B to location C, and the edge attribute of the edge BC is 3, indicating that the person has gone from location B to location C for three times in a period of time. In addition, an edge CB may be generated by pointing from location C to location B, and the edge attribute of the edge CB is 2, indicating that the person has gone from location C to location B for twice in a period of time.

In some embodiments, the public security management platform 230 may determine the action track of the person based on the attribute of the node and the direction of the edge. For example, the node attributes of node A are (16:02, 16:18, 16), (16:30, 16:42, 12), the node attribute of node B is (16:20, 16:28, 8), then the action track of the person may be determined as "node A→node B→node A".

In some embodiments, the public security management platform 230 may determine the track suspicion 550 based on the track diagram 530. Specifically, the public security management platform 230 may process the track diagram 520 through a track suspicion determination model 540, and determine the track suspicion 550.

The track suspicion may refer to the degree of suspicious of the track of the person. It may be understood that degree of suspicious of the track of the person may indicate a possibility for the person to cause the public security incident. The track suspicion may be the value in the interval of [0, 1]. The larger the value, the higher the track suspicion. The track suspicion may further be represented in the form of grades, such as normal, mild, medium, serious.

The track suspicion determination model refers to a model used to determine the track suspicion. In some embodiments, the track suspicion determination model may be a graph neural network (GNN) model. As shown in FIG. 5, an input of the track suspicion determination model 540 may be the track diagram 530, and an output may be the track suspicion 550.

The track suspicion determination model may further be other graph models, such as a graph convolutional neural network (GCNN) model, or adding other processing layers, or change its processing mode to the graph neural network model, modifying its processing methods, etc.

In some embodiments, the track suspicion determination model 540 may take a current node in the track diagram 530 as an output node to output the track suspicion 550. The current node may be the node corresponding to the last location where the person stays. For example, if the node C in the track diagram is the node corresponding to the last location where the person stays, then the node C may output the track suspicion.

In some embodiments, the track suspicion may be obtained based on a plurality of iterations. For example, the public security management platform 230 may update the track diagram 520 of the person based on continuously-obtained monitoring image 510, and further update the attribute of each node and edge in the track diagram 530. Correspondingly, for each update, the track suspicion determination model 540 may perform an update on the track suspicion 550 correspondingly.

In some embodiments, the track suspicion determination model may be obtained through a plurality of training samples with labels. For example, the plurality of training samples with labels may be input to an initial track suspicion determination model, and a loss function may be constructed through the labels and an output of the initial track suspicion determination model, then a parameter of the track suspicion determination model may be iteratively updated based on the loss function, until a preset condition is satisfied, the training is completed, and a trained track suspicion determination model may be obtained. The preset condition may be that the loss function is less than a threshold or convergences, or a training cycle reaches a threshold.

In some embodiments, the training samples may be a plurality of track diagrams with the same structure which are constructed by the action tracks of a plurality of different persons. A data source of the action tracks of the plurality of different persons may be obtained based on the historical monitoring images of a plurality of target regions. The label of the training sample may be the track suspicion corresponding to each action track diagram. In some embodiments, the labels may be determined by analyzing and judging the corresponding action track diagram through experience or by experts. The labels of the training samples may be manually made.

In some embodiments of the present disclosure, when performing a prediction based on the track suspicion determination model, the relationship between the edges and the nodes may be further considered, so as to improve a learning efficiency of the track suspicion determination model, and enhance an accuracy of determining the track suspicion.

In some embodiments, the public security management platform 230 may further analyze the track feature according to a preset rule to determine the track suspicion. For example, one or any combination of the staying time, the number of times of the person appearing in the target region, and the time interval of the appearance may be preset to determine the track suspicion. For example, if a person appears for more than 5 times near the bank within 24 hours, the corresponding track suspicion may be preset to 2 (slightly suspicious); if the person's average staying time in the region is 20 minutes, the corresponding track suspicion may be preset to 5 (medium suspicious); if the time interval of the appearance of the person is 15 minutes, it means that the person is wandering in the region, and is likely to measure those who are depositing or withdrawing money. Then the corresponding wandering suspicion may be preset to 8 (seriously suspicious).

In some embodiments of the present disclosure, when determining the track suspicion of the action track, an actual situation of the staying time and a track direction at a plurality of waypoints in the action track is taken into consideration. It may help to determine the risk of the person to cause a public security incident, further helping the public security management platform to determine the track suspicion of the person accurately and quickly, and helping to further determine the suspicious index of the person.

FIG. 6 is a flowchart illustrating an exemplary process for determining a risk index based on a suspicious group according to some embodiments of the present disclosure. In some embodiments, the process of determining the risk index based on the suspicious group may be implemented by the early warning system 100 for the regional public security management (for example, the processing device 110) or the early warning system 200 for the regional public security management (e.g., the public security management platform 230). For example, the process 600 may be stored in the storage device (e.g., the storage device 140) in the form of a program or an instruction. When the processing device 110 or the security management platform 230 performs the program or the instruction, the process 600 may be achieved. An operation diagram of the process 600 presented as follows is for the purpose of explanation. In some embodiments, one or more additional operations that are not described above and/or one or more operations that are not discussed may be used to complete the process. In addition, the order of the operation of the process 600 described in FIG. 6 is not restrictive.

In 610, determining a distance between suspicious persons based on monitoring images of a plurality of adjacent frames.

The distance may be a straight-line distance between two suspicious persons, which may be determined by a length of the line connecting the two. In some embodiments, the public security management platform 230 may use a plurality of ways to determine the distance between the suspicious persons. For example, the distance between the suspicious persons may be determined through a distant estimating model, an image recognition algorithm, and other modes.

In 620, determining a suspicious group to which the suspicious persons belong based on the distance.

The suspicious group refer to a plurality of suspicious persons who commit crimes belonging to a group. The plurality of suspicious persons who commit crimes may often appear in the same place, with the same path, etc. In some embodiments, there may be a plurality of suspicious groups in the plurality of suspicious persons.

In some embodiments, based on the distance between the suspicious persons in a plurality of adjacent frames, the public security management platform 230 may determine whether the persons belong to the same suspicious group. If the distance between the two suspicious persons in the adjacent frame is less than a preset distance threshold (for example, 2 meters), the number of frames may be further recorded. When the number of frames is greater than a preset frame number, the public security management platform 230 may determine that they belong to the same suspicious group. The preset distance threshold and the preset frame number may be set manually, or they may further be set according to the distance between suspicious persons in the suspicious groups and the corresponding continuous frame numbers in history. For example, the manually set distance threshold may be 2 meters and the number of preset frames may be 30 frames, and the distances between the suspicious persons A and B in 35 continuous frames are all less than 2 meters, then the suspicious person A and B may be determined in the same suspicious group. In some embodiments, the public security management platform 230 may determine whether two suspicious persons belong to the same suspicious group through the moving direction of the two suspicious persons in a plurality of adjacent frames. For example, the suspicious persons A and B move in the same direction in a plurality of continuous frames, and they may be determined as belonging to the same suspicious group. In some embodiments, whether two suspicious persons belong to the same suspicious group may be determined through combining the distance between the two suspicious persons and the moving direction of the two suspicious persons in a plurality of adjacent frames. For example, in a plurality of adjacent frames, the suspicious persons A and B are moving in the same direction and are close to each other (for example, walking side by side), then they may be determined as belonging to the same suspicious group.

In 630, determining the risk index of the target region based on the suspicious group.

In some embodiments, the public security management platform 230 may determine the risk index of the target region based on the number of suspicious groups. The more suspicious groups, the higher the risk index of the target region. For example, the risk index may be the product of the number of suspicious groups and a preset parameter. The preset parameter may be determined according to a number of historical suspicious groups and a corresponding historical risk index. For example, when the number of historical suspicious groups is in a range of 1-3, the corresponding historical risk index may be 0.3. When the number of the suspicious group in the target region A determined by the public management platform 230 is 2, the corresponding preset parameter may be 0.3.

In some embodiments of the present disclosure, through setting the preset parameter, an impact of the number of different suspicious groups on the risk index may be fully considered, which can improve an accuracy of determining the risk index.

In some embodiments, the public security management platform 230 may determine the risk index of the target region based on a sum of suspicious group indexes of suspicious groups in the target region and an amplification factor. A suspicious group index may be a product of a sum of the suspicious index of each suspicious person in the group and the amplification factor.

The amplification factor may reflect the number of suspicious persons in the suspicious group. For example, the more suspicious persons in suspicious groups, the greater the value of the amplification factor. In some embodiments, the amplification factor may be determined according to the number of suspicious persons in the suspicious group. For example, when the number of suspicious persons is 1, the amplification factor of number of people may be 1. Correspondingly, the risk index of the target region may be determined based on the suspicious person. For more content on determining the risk index based on the suspicious person, see FIG. 4 and its related descriptions, which may not be repeated here.

In some embodiments of the present disclosure, determining an influence of each group by considering a plurality of suspicious groups and according to the number of people of each suspicious group to assess the risk index in the target region may help evaluate a probability of a public security incidents in the target region, so as to assess the risk index of the target region more accurately.

In some embodiments, the risk index of the target region may further relate to a distribution vector of the suspicious group in the target region.

The distribution vector of the suspicious group may be used to indicate the number of the suspicious groups and the suspicious index thereof. The distribution vector may be determined based on a bucketing principle. For example, a suspicious group distribution vector may be: (1, 0, 2), which indicates that there is 1 suspicious group with the suspicious index between 0-40, there are 0 suspicious group with the suspicious index between 40-70, and there are 2 suspicious groups with the suspicious index between 70-100.

In some embodiments, the risk index of the target region may further be the product of the sum of the suspicious group index of each suspicious group and a weight.

In some embodiments, the weight may be determined based on a preset rule table. It may be understood that a general suspicious index of two suspicious groups with suspicious index being 50 each is the same with that of one suspicious group with suspicious index being 100. However, the risk indexes of the corresponding regions may not be the same, as the probability for the latter to cause a public security incident may be higher than the former. Correspondingly, a designing rule of the preset rule table may be the larger the proportion of a suspicious group with high suspicious index in the distribution vector of the suspicious group, the greater the weight. The suspicious group with high suspicious index refers to the suspicious group with a suspicious index greater than a preset threshold. For example, the preset threshold may be 70, and the suspicious group with a suspicious index greater than 70 may be a suspicious group with high suspicious index.

As an example, when the distribution vector of the suspicious group is (1, 1, 0), it means that there is one suspicious group with the suspicious index between 0-40, one suspicious group with the suspicious index between 40-70, and no suspicious group with the suspicious index between 70-100. That is, the proportion of the suspicious group with the high suspicious index is 0, and the corresponding weight may be 1.1. When the distribution vector of the suspicious group is (0, 2, 2), it means that there is no suspicious group with the suspicious index between 0-40, 2 suspicious groups with the suspicious indexes between 40-70, and 2 suspicious groups with suspicious indexes between 70-100. That is, the proportion of the suspicious group with the high suspicious index is 50%, and the corresponding weight may be 1.2.

In some embodiments of the present disclosure, by determining whether the suspicious person belongs to the suspicious group, the risk index of the target area may be further determined according to the suspicious group. By considering the plurality of suspicious groups and determining the influence of each group according to the number of persons of each suspicious group, the risk index of the target region may be evaluated more accurately, which helps to evaluate the probability of the public security incident occurred in the target region, thereby evaluating the risk index of the target region more accurately. At the same time, through the distribution vector of the suspicious group designed based on the bucketing principle, the risk index may be determined according to the proportion of the suspicious groups with the high suspicious index, so that the risk index of the suspicious group determined may be more accurate.

It should be noted that the above description of the process 600 is only for the purpose of illustration, but not intended to limit the scope of the present disclosure. For those skilled in the art, under the guidance of the present disclosure, various amendments and changes may be made on the process 600. However, these amendments and changes are still within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An early warning method for a regional public security management in a smart city based on an Internet of Things (IoT), wherein the IoT includes a user platform, a service platform, a public security management platform, a sensing network platform and object platforms interacted in turn, the early warning method comprising:

obtaining, based on the user platform, a user's inquiry instruction of each region, and sending the inquiry instruction to the public security management platform through the service platform;

in response to the inquiry instruction, obtaining, from at least one monitoring device of at least one target region based on a sensing network sub-platform of the sensing network platform, a monitoring image of the at least one target region by the public security management platform; the at least one monitoring device being configured in the different object platforms, wherein the sensing network platform uses different sensing network sub-platforms to store, process and/or transmit data from different object platforms, and the sensing network sub-platforms correspond to different target regions; the public security management platform uses different management sub-platforms for the data storage, the data processing and/or the data transmission, and performs a data summarizing, the data processing and the data transmission through a general database of the public security management platform;

sending, based on the sensing network sub-platform, the monitoring image of the corresponding target region to the management sub-platform;

processing, based on the management sub-platform, the monitoring image to determine a risk index of the at least one target region, wherein the determining the risk index of the at least one target region based on the monitoring image comprises:

determining a suspicious index of each of one or more persons in the monitoring image, wherein the suspicious index grows with an increase of time of the at least one person staying in the at least one target region, a growth rate of the suspicious index is related to a region type of a region where a suspicious person stays and a track suspicion, and the track suspicion is determined through the following operations:

obtaining an action track of each person in the monitoring image;

extracting a track feature based on the action track, wherein the track feature is expressed by a track diagram, a node of the track diagram corresponding to each location, an attribute of the node including times when person appears and leaves, an edge of the track diagram being a one-way edge, a direction of the edge indicating that the person goes from one place to another place, and an attribute of the edge including a number of times of the person goes from the one place to the another place; and by processing the track diagram based on a track suspicion determination model, determining the track suspicion, wherein the track suspicion determination model is a graph neural network model, the track suspicion is output based on a node corresponding to a last place where the person stays;

determining one or more suspicious persons in response to the determination that the suspicious index meets a preset condition; and determining, based on the one or more suspicious persons, the risk index of the target region, wherein the determining the risk index of the target region based on the one or more suspicious persons comprises:

determining, based on monitoring images of a plurality of adjacent frames, a distance between the one or more suspicious persons;

determining, based on the distance, a suspicious group to which the one or more suspicious persons belong; and determining, based on the suspicious group, the risk index of the target region, wherein the determining the risk index of the target region based on the suspicious group comprises:

determining, based on a sum of suspicious group indexes of suspicious groups in the target region and an amplification factor, the risk index of the target region, wherein a suspicious group index is a product of a sum of the suspicious index of each suspicious person in the group and the amplification factor;

generating early warning information in response to the risk index of the target region greater than a first threshold, and sending the early warning information to the user platform through a general database of the management platform and the service platform; and obtaining a management instruction based on the user platform, and controlling, according to the management instruction, an unmanned aerial vehicle (UAV) to go to the target region for monitoring.

2. The early warning method of claim 1, wherein the early warning method further comprises:

obtaining a plurality of risk indexes of the target region in a plurality of time periods; and determining, in response to an average value of the plurality of risk indexes greater than a second threshold, the target region as a daily patrol point.

3. An early warning system for a regional public security management in a smart city based on the Internet of Things (IoT), wherein the early warning system includes a user platform, a service platform, a public security management platform, a sensing network platform and an object platform interacted in turn, wherein:

the user platform is configured as at least one terminal device to obtain a user's inquery instruction on a risk index of each region;

the object platform is configured as at least one monitoring device; and the public management platform is configured to:

obtain the inquiry instruction based on the user platform;

in response to the inquiry instruction, obtain, from at least one monitoring device of at least one region based on a sensing network sub-platform of the sensing network platform, a monitoring image of the at least one target region by the public security management platform; the at least one monitoring device being configured in the different object platforms, wherein the sensing network platform uses different sensing network sub-platforms to store, process and/or transmit data from different object platforms, and the sensing network sub-platforms respond to different target regions; the public security management platform uses different management sub-platforms for the data storage, the data processing and/or the data transmission, and performs a data summarizing, the data processing and the data transmission through a general database of the public security management platform;

send, based on the sensing network sub-platform, the monitoring image of the corresponding target region to the management sub-platform;

process, based on the management sub-platform, the monitoring image to determine a risk index of the at least one target region, wherein the determining the risk index of the at least one target region based on the monitoring image comprises:

determining a suspicious index of each of one or more persons in the monitoring image, wherein the suspicious index grows with an increase of time of at least one person staying in the at least one target region, a growth rate of the suspicious index is related to a region type of a region where a suspicious person stays and a track suspicion, and the track suspicion is determined through the following operations:

obtaining an action track of each person in the monitoring image;

extracting a track feature based on the action track, wherein the track feature is expressed by a track diagram, a node of the track diagram corresponding to each location, an attribute of the node including times when person appears and leaves, an edge of the track diagram being a one-way edge, a direction of the edge indicating that the person goes from one place to another place, and an attribute of the edge including a number of times of the person goes from the one place to the another place; and by processing the track diagram based on a track suspicion determination model, determining the track suspicion, wherein the track suspicion determination model is a graph neural network model, the track suspicion is output based on a node corresponding to a last place where the person stays;

determining one or more suspicious persons in response to the determination that the suspicious index meets a preset condition; and determining, based on the one or more suspicious persons, the risk index of the target region, wherein the determining the risk index of the target region based on the one or more suspicious persons further comprises:

determining, based on monitoring images of a plurality of adjacent frames, a distance between the one or more suspicious persons;

determining, based on the distance, a suspicious group to which the one or more suspicious persons belong; and determining, based on the suspicious group, the risk index of the target region; wherein the determining the risk index of the target region based on the suspicious group comprises:

determining, based on a sum of suspicious group indexes of suspicious groups in the target region and an amplification factor, the risk index of the target region, wherein a suspicious group index is a product of a sum of the suspicious index of each suspicious person in the group and the amplification factor;

generate early warning information in response to the risk index of the target region greater than a first threshold, and send the early warning information to the user platform through a general database of the management platform and the service platform; and obtain a management instruction based on the user platform, and control, according to the management instruction, an unmanned aerial vehicle (UAV) to go to the target region for monitoring.

4. The early warning system of claim 3, wherein the public security management platform is further configured to perform the following operations:

obtaining a plurality of risk indexes of the target region in a plurality of time periods; and determining, in response to an average value of the plurality of risk indexes greater than a second threshold, the target region as a daily patrol point.

5. An early warning device for a regional public security management in a smart city based on the Internet of Things (IoT), including a processor, wherein the processor is used to perform the early warning method of claim 1.

6. A non-transitory computer-readable storage medium storing computer instructions, wherein when reading the computer instructions in the storage medium, a computer implements the early warning method for a regional public security management in a smart city based on the Internet of Things (IoT) according to claim 1.

* * * * *